Aug. 7, 1956 S. G. ESKIN 2,758,178
MULTIPLE ACTION THERMOSTATIC CONTROL DEVICES
Filed March 9, 1955 2 Sheets-Sheet 1
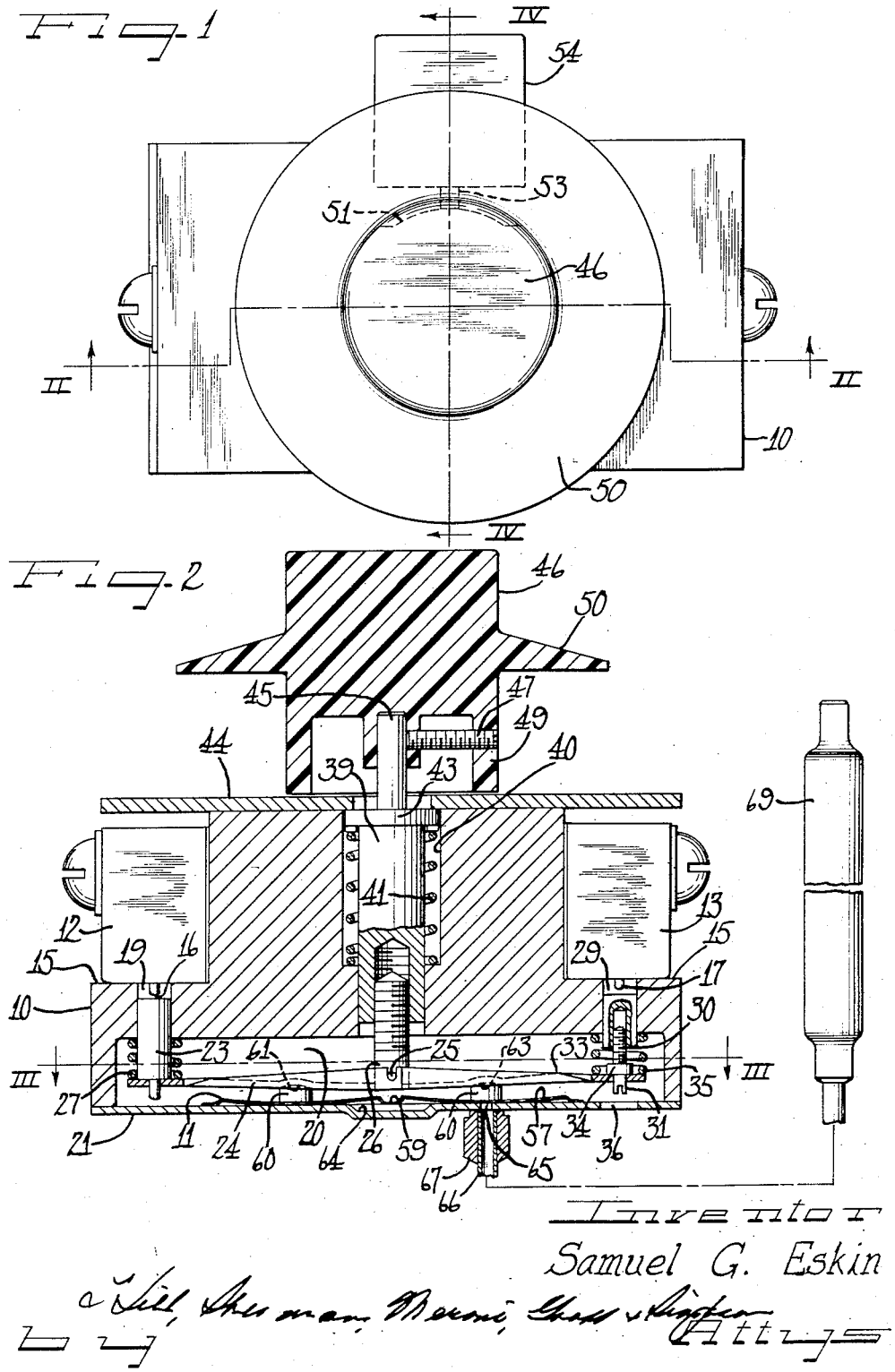
Inventor
Samuel G. Eskin Aug. 7, 1956 S. G. ESKIN 2,758,178
MULTIPLE ACTION THERMOSTATIC CONTROL DEVICES
Filed March 9, 1955 2 Sheets-Sheet 2

Inventor
Samuel G. Eskin

United States Patent Office 2,758,178
Patented Aug. 7, 1956

2,758,178
MULTIPLE ACTION THERMOSTATIC CONTROL DEVICES

Samuel G. Eskin, Chicago, Ill., assignor to The Dole Valve Company, Chicago, Ill., a corporation of Illinois Application March 9, 1955, Serial No. 493,249

11 Claims. (Cl. 200—140)

This invention relates to improvements in multiple action thermostatic control devices and more particularly relates to such devices for controlling the opening and closing of a series of electrical circuits upon predetermined temperature conditions.

A principal object of my invention is to provide a multiple action thermostatic control device controlled by a single knob and particularly adapted to control a multiplicity of operations of refrigerating devices such as room air conditioners, although not limited to such uses.

A further object of my invention is to provide a simple and positively acting multi-action thermostatically operated device for operating a multiplicity of switching devices upon predetermined temperature conditions.

A further object of my invention is to provide a multi-action thermostatic control device in which a multiplicity of switches may be operated at different temperature conditions through a single thermostatic element.

Still another object of my invention is to provide a simple and improved dual action electrical thermostat in which a multi-diaphragm element operated from a single bulb controls the closing of a series of electrical circuits upon predetermined temperature conditions.

A still further and more detailed object of my invention is to provide a multiple action thermostatic control device utilizing a dual diaphragm thermal element, each diaphragm of which serves to operate an electrical control switch upon predetermined temperature rises, and in which a common knob serves to adjust the temperature of operation of the switches.

These and other objects of my invention will appear from time to time as the following specification proceeds and with reference to the accompanying drawings wherein:

Figure 1 is a plan view of a thermostatic control device constructed in accordance with my invention;

Figure 2 is a sectional view taken substantially along line II—II of Figure 1;

Figure 3:
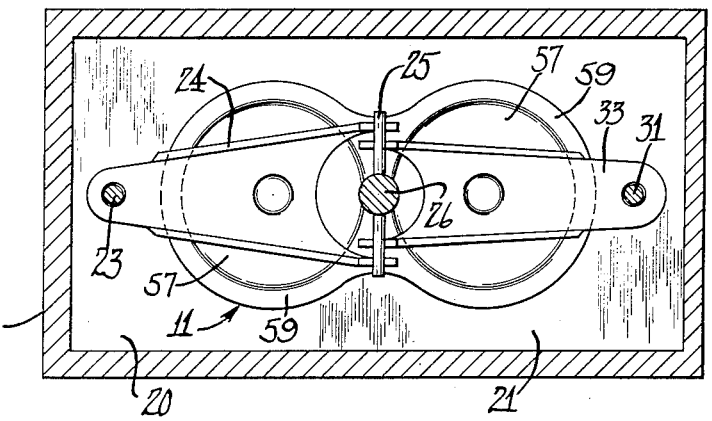
Figure 3 is a sectional view taken substantially along line III—III of Figure 2.
Figure 4:
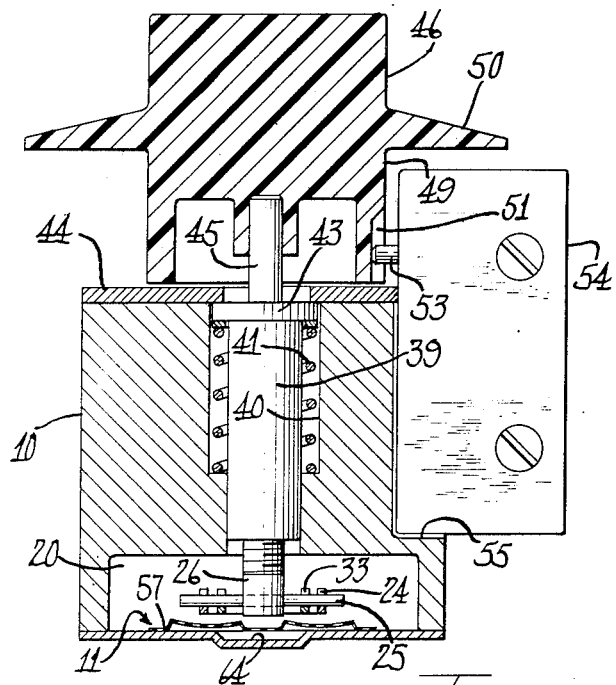
Figure 4 is a transverse sectional view taken substantially along line IV—IV of Figure 1.

In the embodiment of my invention illustrated in the drawings, I have shown a casing 10 for a thermal element 11 for operating a plurality of switches 12 and 13 for making and breaking electrical circuits upon predetermined temperature conditions.

The switches 12 and 13 are shown as being recessed in the body of the casing 10 and as abutting shouldered portions 15, 15 thereof. Each switch 12 and 13 may be a well known form of micro or limit switch, so need not be shown or described in detail herein. The switches 12 and 13 have depressible buttons 16 and 17 respectively, which may be depressed to make or break an electric circuit, as desired.

The depressible button 16 of the switch 12 is shown as extending within an apertured portion 19 leading from the shoulder 15 to a recessed portion 20 of the casing 10 and closed by a base plate 21 of the thermal element 11. The base plate 21 may be suitably secured to the outside of said casing as by machine screws (not shown), or any other suitable securing devices.

The button 16 of the switch 12 is adapted to be operated by a plunger 23 slidably guided in the apertured portion 19 of the casing 10 and carried on the outer end of a lever arm 24. The lever arm 24 fulcrums about a transverse pivot pin 25, shown as extending through and beyond opposite sides of a threaded temperature adjusting pin 26. A spring 27 encircles the plunger 23 and is interposed between the wall of the recessed portion 20 and the inside of the lever arm 24, to bias the lever arm 24 and plunger 23 out of engagement with the operating button 16 for the switch 12.

The operating button 17 for the switch 13, in a like manner, extends within an apertured portion 29 extending parallel to the apertured portion 19 and opening into the recessed portion 20 of the casing 12. The button 17 is shown as being operated by plunger 30 slidably guided in the apertured portion 29 of the casing 10. The plunger 30 has an adjustment screw 31 threaded therein and extending through an operating lever 33 similar to the lever 24 and fulcrumed on the transverse pivot pin 25. The adjusting screw 31 is shown as having a collar 34 suitably secured thereto and abutting the lever 33. The plunger 30 and adjustment screw 31 are encircled by a compression spring 35, interposed between the wall of the recessed portion 20 of the casing 10 and the lever arm 33 to bias the lever arm 33 in an inoperative position. An opening 36 is provided in the base plate 21 in alignment with the adjustment screw 31 to afford access to said screw by a screw driver or like device to adjust the operating temperature of the plunger 30 and the switch 13. The purpose of this adjustment screw is to change the temperature setting of the switch 13 with respect to the switch 12 to effect operation of one switch in advance of the other at a predetermined difference in operating temperature from the operating temperature of one switch, as desired.

The threaded pin 26 is shown as being threaded within the inner end of an internally threaded adjustment screw 39, rotatably carried within a shouldered aperture 40, extending through the casing 10 from one end thereof and opening into the recessed portion 20 thereof. A spring 41 is interposed between the shoulder of the shouldered apertured portion 40 and a head 43 of the adjustment member 39 to bias said head into engagement with a cover plate 44 extending across the top of the casing 10 and over the shouldered apertured portion 40 thereof and suitably secured thereto.

The adjustment member 39 is shown as having a shaft 45 extending upwardly therefrom through the plate 44, and as having an operating knob 46 secured thereto as by a set screw 47. Turning movement of the knob 46 will thus adjust the position of the fulcrum pin 25 for the levers 24 and 33 with respect to the thermal element 11, to vary the travel of said levers required to depress the respective plungers or buttons 16 and 17 and thus to vary the operating temperature of the thermostat.

The knob 46 may be calibrated and may have an index plate (not shown) associated therewith to indicate the temperatures at which the switches 12 and 13 will operate and also to indicate the devices to be operated upon turning of said knob from one position to another.

The knob 46 is shown as having an inner cylindrical wall portion 49 spaced inwardly of an indexing flange 50 thereof, having a recessed cam face 51 engageable with an operating button 53 of a micro or limit switch 54, extending within a recessed portion 55 of the casing 10 and suitably secured thereto. The limit switch 54 is shown as extending above the top of the casing 10 and the plate 44, to position the operating button 53 thereof, for operation by the cam 51 upon turning of the knob 46 to a predetermined position. It should here be understood that while only one limit switch 54 is shown that additional limit switches may be provided to operate other devices upon the turning of the knob 46 to other operating positions.

The thermal element 11 is shown as being a fluid pressure operated thermal element of the diaphragm type in which a shallow double diaphragm 57 stamped or otherwise formed from a single piece of thin sheet metal is utilized to operate the two levers 24 and 33. As herein shown, the double diaphragm 57 is resistance welded to the base plate 21 along its edge. Each diaphragm is of a generally circular inwardly dished form having a flat outer flanged portion 59 joined together at the adjacent ends of the two diaphragms.

Each diaphragm is shown as having an operating button 60 in the center of the inwardly dished portion thereof. One button 60 is engageable within a downwardly opening recessed portion 61 of the lever 24, to operate the same upon extension of said diaphragm from the base plate 21. The other button 60 is engageable within a recessed portion 63 of the operating lever 33 for operating the same upon extension of said diaphragm with respect to the base plate 21. The base plate 21 is shown as having a recessed portion 64 therein at the junction of the two diaphragms to accommodate the free flow of hydraulic fluid from one diaphragm to the other.

The base plate 21 is also shown as having a passageway 65 leading therethrough in axial alignment with the button 60 for operating the operating lever 33. It is, of course, understood that the passageway 65 may be positioned in axial alignment with either operating button 60. A capillary tube 66 extends from the passageway 65 and is carried in a connector 67 welded or otherwise secured to the base plate 21 and extending outwardly therefrom. The capillary tube 66 has association with a thermal bulb 69, which may be filled with a thermally expansible fluid, expanding upon predetermined temperature rises such as a rise in room temperature where the thermostatic control device is to be used for controlling operation of a room air conditioner to extend the diaphragms 57 and operating buttons 60 with respect to the base plate 21, and pivot the lever arms 24 and 33 about the fulcrum pin 25, to depress the push buttons 16 and 17 and operate the switches 12 and 13.

It may be seen from the foregoing that I have provided an extremely simple form of multi-action thermostatic control device, which may operate a multiplicity of devices to be operated, such as, a plurality of switches controlling the operation of a room air conditioner or like device for operating certain operative parts thereof in a predetermined sequence depending upon temperature conditions.

It may further be seen that the temperature of operation of the operating devices may be varied by the simple operation of a single control knob and that the control knob itself may also operate additional switches in predetermined positions of adjustment thereof.

It will be understood that modification and variations of the present invention may be effected without departing from the spirit and scope of the novel concepts thereof.

I claim as my invention:

1. In a multiple action thermostatic control device, a casing, a plurality of devices to be operated carried by said casing, a thermal element within said casing comprising a base plate closing an end of said casing and having a passageway leading therethrough, a capillary and thermal bulb containing a thermally expansible medium leading from said passage, two connected diaphragms secured to the opposite side of said plate from said capillary in association with said passage therethrough, each diaphragm having a power member thereon, an individual lever arm engageable with each power member and operated thereby, each lever arm having operative connection with a device to be operated, and a common fulcrum for each lever arm.

2. In a multiple action thermostatic control device, a casing, a plurality of devices to be operated carried by said casing, a thermal element within said casing comprising a base plate closing an end of said casing and having a passageway leading therethrough, a capillary and thermal bulb containing a thermally expansible medium and having communication with said passageway on the outside of said plate, two connected diaphragms secured to the opposite side of said plate from said capillary in association with said passageway leading therethrough, each diaphragm having a power member thereon, an individual lever arm engageable with each power member and operated thereby, each lever arm having operative connection with a device to be operated, a common fulcrum for said lever arms, and a single knob for adjusting the position of said fulcrum with respect to said power members and the temperature range of operation of said devices to be operated.

3. In a multiple action thermostatic control device, a casing, a plurality of switches carried by said casing, each having a depressible button, a thermal element for operating said switches comprising a plate closing an end of said casing, said plate having a passageway extending therethrough and having a capillary and thermal bulb in association with said passageway and extending from the outside of said plate, and two connected diaphragms in association with said passageway and secured to the inside of said plate in leakproof relation with respect thereto, said diaphragms with said plate forming a thermally expansible chamber and each having a power member thereon movable in the direction of the axis of said button, individual levers for operating each of said switches, a common fulcrum for each of said levers, a separate engaging connection between each power member and an associated lever for operating the same upon extensible movement of said power members, and an adjustment knob for adjusting the position of said common fulcrum with respect to said power members and the temperature of operation of said switches.

4. In a multiple action thermostatic control device, a casing, a plurality of switches carried by said casing, a thermal element for operating said switches comprising a plate closing an end of said casing said plate having a passageway leading therethrough, a capillary and thermal bulb in association with said passageway and extending outwardly from said plate, two connected diaphragms in association with said passageway and secured to the inside of said plate in leakproof relation with respect thereto, said diaphragms with said plate forming a thermally expansible chamber and each having a power member thereon, individual levers for operating each of said switches, a common fulcrum for each of said levers, a separate engaging connection between each power member and an associated lever for operating the same upon extensible movement of said power members, an adjustable support for said common fulcrum for adjusting the position of said support with respect to said power members and the temperature of operation of said switches, and a single knob rotatable to adjust the position of said support and fulcrum and the temperature of operation of said switches.

5. In a multiple action thermostatic control device, a casing, a plurality of switches carried by said casing, a thermal element for operating said switches comprising a plate closing an end of said casing, said plate having a passageway extending therethrough, a capillary and thermal bulb in association with said passageway and extending from the outside of said plate, two connected diaphragms in association with said passageway and secured to the inside of said plate in leakproof relation with respect thereto, said diaphragms with said plate forming a thermally expansible chamber and each having a power member thereon, individual levers for operating each of said switches, a common fulcrum for each of said levers, a separate engaging connection between each power member and an associated lever for operating the same upon extensible movement of said power members, an adjustable support for said common fulcrum for adjusting the temperature of operation of said switches, and a single knob rotatable to adjust the position of said support and fulcrum and the temperature of operation of said switches, said casing having at least one additional switch secured thereto having a depressible operating member, and a cam on said knob engageable with said operating member for operating said switch upon turning said knob to vary the temperature range of operation of said first mentioned switches.

6. In a multiple action thermostatic switch device, a plurality of regulating switches, a thermal element for operating the same comprising a dual acting diaphragm, a capillary tube and bulb containing a thermally expansible material associated with said diaphragm, said diaphragm having two spaced power members, individual lever means connected with each switch and engaged by said power members for operating the same, a common pivot for said lever means, adjusting means for adjusting the position of said pivot with respect to said power members and the temperatures at which said switches operate, and an adjustment screw interposed between one of said lever means and one of said switches, for calibrating the temperatures of operation of said switches with respect to each other.

7. In a multiple action thermostatic switch device particularly adapted for air conditioners and the like, at least two spaced switches, a thermal element for operating the same comprising a base plate having a diaphragm secured thereto at its edges, a capillary leading through said plate to said diaphragm, said diaphragm being a multi-action diaphragm in the form of two individual connected diaphragms and each having a power member thereon, individual lever arms engaged by said power members and having operative engagement with an assocated switch, a common pivot for said lever arms, a knob operable to vary the position of said pivot with respect to said power members and switches, to vary the operating temperature of the thermostat, and the operative connection between at least one of said lever arms and at least one of said switches including an adjustment screw for varying the lag of operation of said switches with respect to each other.

8. In a multiple action thermostatic switch particularly adapted for air conditioners and like devices, at least two spaced switches, a thermal element for operating said switches comprising a base plate having two connected diaphragms secured thereto at the edges thereof, a passageway leading through said plate to said diaphragms, a capillary tube and bulb containing a thermally expansible medium and having connection with said passageway, a power member on each diaphragm, an individual lever arm for operating each switch and having operative connection therewith, a common pivot for said lever arms, an engaging connection between said power members and said lever arms, an operating knob, an adjustable connection between said common pivot and said operating knob for varying the position of said pivot with respect to said power members and varying the operating temperature thereof upon turning movement of said knob, at least one additional switch, and a cam on said knob for operating said additional switch upon turning movement of said knob.

9. In a combination manual and thermostatic switching device, a support casing, a plurality of switches mounted on said casing, thermostatic means supported by said casing for operating one of said switches at a predetermined temperature of operation of said thermostatic means, and adjustable means supported by said casing and rotatable to adjust the predetermined temperature at which said thermostatic means will operate said one switch, said adjustable means also having means to manually operate another of said switches independently of said thermostatic means upon rotation of said adjustable means.

10. In a combination manual and thermostatic switching device, a support casing, a plurality of switches mounted on said casing, thermostatic means mounted on said casing for operating said switches in a selected sequence upon predetermined temperature rises, an adjusting knob for said thermostatic means rotatably supported by said casing to adjust the temperature range of operation of at least the first of said switches to operate, at least one additional switch supported by said casing, and a cam on said knob for operating said one additional switch upon turning movement of said knob to a predetermined position.

11. In a combination manual and thermostatic switching device, a support casing, a plurality of switches mounted on said casing, thermostatic means supported by said casing for operating at least one of said switches at a predetermined temperature of operation of said thermostatic means and having an extensible power member, an adustable leverage connection between said power member and at least one of said switches for adjusting the temperature of operation of at least one of said switches, and an operating knob rotatably supported by said casing to adjust said leverage connection and the predetermined temperature at which said thermostatic means will operate at least one of said switches, said operating knob hav- a cam thereon to manually operate another of said switches independently of said thermostatic means upon rotation of said knob to a predetermined position.

References Cited in the file of this patent

UNITED STATES PATENTS

| | | |
|---|---|---|
| 1,667,056 | Smith | Apr. 24, 1928 |
| 2,355,975 | Henrici | Aug. 15, 1944 |
| 2,506,623 | Williams | May 9, 1950 |